United States Patent
Bao

(10) Patent No.: US 11,014,157 B2
(45) Date of Patent: May 25, 2021

(54) SOLID PCD WITH TRANSITION LAYERS TO ACCELERATE FULL LEACHING OF CATALYST

(71) Applicant: Smith International, Inc., Houston, TX (US)

(72) Inventor: Yahua Bao, Orem, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 918 days.

(21) Appl. No.: 15/536,875

(22) PCT Filed: Nov. 19, 2015

(86) PCT No.: PCT/US2015/061505
§ 371 (c)(1),
(2) Date: Jun. 16, 2017

(87) PCT Pub. No.: WO2016/099784
PCT Pub. Date: Jun. 23, 2016

(65) Prior Publication Data
US 2017/0341147 A1   Nov. 30, 2017

Related U.S. Application Data

(60) Provisional application No. 62/092,948, filed on Dec. 17, 2014.

(51) Int. Cl.
*E21B 10/55* (2006.01)
*E21B 10/567* (2006.01)
(Continued)

(52) U.S. Cl.
CPC .................. *B22F 3/15* (2013.01); *B22F 3/14* (2013.01); *B22F 5/00* (2013.01); *B22F 7/02* (2013.01);
(Continued)

(58) Field of Classification Search
CPC ........ B22F 3/15; B22F 2005/001; B22F 3/14; B22F 5/00; B22F 7/02; C22C 1/1036; C22C 26/00; E21B 10/46; E21B 10/55
See application file for complete search history.

(56) References Cited

U.S. PATENT DOCUMENTS 4,871,377 A   10/1989   Frushour
6,009,963 A    1/2000   Chaves et al.
(Continued)

FOREIGN PATENT DOCUMENTS

WO   2011017625 A2   2/2011

OTHER PUBLICATIONS

Second Office Action issued in Chinese Patent Application 201580074422.6 dated Jun. 25, 2019, 7 pages.
(Continued)

*Primary Examiner* — Pegah Parvini

(57) ABSTRACT

A method of making a polycrystalline diamond compact includes forming a first layer of polycrystalline diamond precursor materials comprising diamond particles and a first concentration of catalyst, forming a second layer of polycrystalline diamond precursor materials comprising diamond particles and a second concentration of catalyst, and placing a layer of an infiltrant material in the proximity of the first or the second layer of polycrystalline diamond precursor materials. The second concentration of catalyst is greater than the first concentration of catalyst. The infiltrant material is a catalyst. The first layer and the second layer are sintered under high-pressure high-temperature conditions in the presence of the infiltrant material to form the polycrystalline diamond compact. At least a portion of the catalyst is leached from the polycrystalline diamond compact.

11 Claims, 6 Drawing Sheets

(51) Int. Cl.
*B22F 3/15* (2006.01)
*C22C 1/10* (2006.01)
*C22C 26/00* (2006.01)
*B22F 3/14* (2006.01)
*B23B 27/20* (2006.01)
*B22F 5/00* (2006.01)
*B22F 7/02* (2006.01)
*C22B 3/00* (2006.01)

(52) U.S. Cl.
CPC .......... *B23B 27/20* (2013.01); *C22B 23/0415* (2013.01); *C22C 1/1036* (2013.01); *C22C 26/00* (2013.01); *E21B 10/55* (2013.01); *E21B 10/567* (2013.01); *B22F 2005/001* (2013.01); *B22F 2301/15* (2013.01); *B22F 2302/406* (2013.01); *B22F 2304/10* (2013.01)

(56) References Cited

U.S. PATENT DOCUMENTS

| | | | |
|---|---|---|---|
| 6,544,308 B2 | 4/2003 | Griffin et al. | |
| 7,513,320 B2 | 4/2009 | Mirchandani et al. | |
| 8,080,071 B1 | 12/2011 | Vail | |
| 8,162,082 B1* | 4/2012 | Gonzalez | E21B 10/567 175/428 |
| 8,267,204 B2 | 9/2012 | Lyons | |
| 8,277,722 B2 | 10/2012 | DiGiovanni | |
| 8,328,891 B2 | 12/2012 | Zhang et al. | |
| 8,353,371 B2 | 1/2013 | Cooley et al. | |
| 8,470,060 B2 | 6/2013 | Griffo et al. | |
| 8,573,332 B2 | 11/2013 | Scott | |
| 8,590,130 B2 | 11/2013 | Zhang et al. | |
| 8,702,824 B1* | 4/2014 | Sani | B24D 18/00 51/297 |
| 9,091,131 B2 | 7/2015 | Yu et al. | |
| 9,482,056 B2 | 11/2016 | Eyre et al. | |
| 2007/0169419 A1 | 7/2007 | Davis et al. | |
| 2008/0023231 A1* | 1/2008 | Vail | B82Y 30/00 175/434 |
| 2008/0223623 A1 | 9/2008 | Keshavan et al. | |
| 2009/0152017 A1 | 6/2009 | Shen et al. | |
| 2009/0263308 A1 | 10/2009 | Hall et al. | |
| 2010/0012389 A1 | 1/2010 | Zhang et al. | |
| 2010/0095602 A1 | 4/2010 | Belnap et al. | |
| 2010/0281782 A1 | 11/2010 | Keshavan et al. | |
| 2011/0031033 A1* | 2/2011 | Mourik | E21B 10/567 175/428 |
| 2012/0125696 A1 | 5/2012 | Belnap et al. | |
| 2012/0247841 A1 | 10/2012 | Tessitore et al. | |
| 2013/0152480 A1 | 6/2013 | Eyre et al. | |
| 2014/0013671 A1 | 1/2014 | Belnap et al. | |
| 2014/0166371 A1* | 6/2014 | Whittaker | E21B 10/573 175/432 |

OTHER PUBLICATIONS

Third Office Action issued in Chinese Patent Application 201580074422.6 dated Dec. 24, 2019, 7 pages.
International Preliminary Report on Patentability issued in International Patent application PCT/US2015/061505, dated Jun. 20, 2017, 11 pages.
First Office Action issued in Chinese Patent Application 201580074422.6 dated Oct. 29, 2018, 14 pages.
International Search Report and Written Opinion issued in International application PCT/US2015/061505 dated Feb. 12, 2016. 19 pages.
Liu et al., Effect of removing internal residual metallic phases on wear resistance of polycrystalline diamond compacts. International Journal of Refractory Metals and Hard Materials, vol. 31, Mar. 2012, pp. 187-191.
Poyet et al., Accelerated leaching of cementitious materials using ammonium nitrate (6M): influence of test conditions. European Journal of Environmental and Civil Engineering, 16(3-4), 336-351; 2012.
Sneddon et al., Polycrystalline diamond: manufacture, wear mechanisms, and implications for bit design. Journal of Petroleum Technology; vol. 40, No. 12, Dec. 1988.
Astakhov, V.P., Tribology of cutting tools. Tribology in Manufacturing Technology. Springer Berlin Heidelberg, 2013. pp. 1-66.

* cited by examiner leaching

SOLID PCD WITH TRANSITION LAYERS TO ACCELERATE FULL LEACHING OF CATALYST

CROSS REFERENCE

This application claims the benefit of U.S. Provisional Application No. 62/092,948, entitled "SOLID PCD WITH TRANSITION LAYERS TO ACCELERATE FULL LEACHING OF CATALYST," filed Dec. 17, 20014, the disclosure of which is incorporated by reference.

BACKGROUND

Polycrystalline diamond ("PCD") materials and PCD elements formed therefrom are well known in the art. Conventional PCD may be formed by subjecting diamond particles in the presence of a suitable solvent metal catalyst material to processing conditions of high-pressure high-temperature (HPHT), where the solvent metal catalyst promotes desired intercrystalline diamond-to-diamond bonding between the particles, thereby forming a PCD structure. The resulting PCD structure produces enhanced properties of wear resistance and hardness, making such PCD materials extremely useful in aggressive wear and cutting applications where high levels of wear resistance and hardness are desired. FIG. 1 illustrates a microstructure of conventionally formed PCD material 100 including a plurality of diamond grains 120 that are bonded to one another to form an intercrystalline diamond matrix first phase. The catalyst/binder material 140, e.g., cobalt, used to facilitate the diamond-to-diamond bonding that develops during the sintering process is dispersed within the interstitial regions formed between the diamond matrix first phase. The term "particle" refers to the powder employed prior to sintering a superabrasive material, while the term "grain" refers to discernable superabrasive regions subsequent to sintering.

The catalyst/binder material used to facilitate diamond-to-diamond bonding can be provided generally in two ways. The catalyst/binder can be provided in the form of a raw material powder that is pre-mixed with the diamond particles or grit prior to sintering. In some cases, the catalyst/binder can be provided by infiltration into the diamond material (during high-temperature high-pressure processing) from an underlying substrate material that the final PCD material is to be bonded to. After the catalyst/binder material has facilitated the diamond-to-diamond bonding, the catalyst/binder material is generally distributed throughout the diamond matrix within interstitial regions formed between the bonded diamond grains. Particularly, as shown in FIG. 1, the binder material 140 is not continuous throughout the microstructure in the conventional PCD material 100. Rather, the microstructure of the conventional PCD material 100 may have a uniform distribution of binder 140 among the PCD grains 120. Thus, crack propagation through the PCD material 100 will often travel through the less ductile and more brittle diamond grains 120, either transgranularly through diamond grain/binder interfaces 150, or intergranularly through the diamond grain/diamond grain interfaces 160.

Catalyst materials may facilitate diamond intercrystalline bonding and bonding of PCD layers to each other and to an underlying substrate. Catalyst materials typically used for forming PCD may include metals from Group VIII of the Periodic Table, such as cobalt, iron, or nickel and mixtures or alloys thereof, with cobalt being the most common. Conventional PCD may include from 85 to 95% by volume diamond and a remaining amount of the catalyst material. However, while higher metal content typically increases the toughness of the resulting PCD material, higher metal content also decreases the PCD material hardness, thus limiting the flexibility of being able to provide PCD coatings having desired levels of both hardness and toughness. Additionally, when variables are selected to increase the hardness of the PCD material, typically brittleness also increases, thereby reducing the toughness of the PCD material.

PCD is commonly used in earthen drilling operations, for example in cutting elements used on various types of drill bits. Although PCD is extremely hard and wear resistant, PCD cutting elements may still fail during normal operation. Failure may occur in three common forms, namely wear, fatigue, and impact cracking. The wear mechanism occurs due to the relative sliding of the PCD relative to the earth formation, and its prominence as a failure mode is related to the abrasiveness of the formation, as well as other factors such as formation hardness or strength, and the amount of relative sliding involved during contact with the formation. Excessively high contact stresses and high temperatures, along with a very hostile downhole environment, also tend to cause severe wear to the diamond layer. The fatigue mechanism involves the progressive propagation of a surface crack, initiated on the PCD layer, into the material below the PCD layer until the crack length is sufficient for spalling or chipping. Lastly, the impact mechanism involves the sudden propagation of a surface crack or internal flaw initiated on the PCD layer, into the material below the PCD layer until the crack length is sufficient for spalling, chipping, or catastrophic failure of the cutting element.

SUMMARY

This summary is provided to introduce a selection of concepts that are further described below in the detailed description. This summary is not intended to identify key or essential features of the claimed subject, nor is it intended to be used as an aid in limiting the scope of the claimed subject matter.

In one aspect, embodiments of the present disclosure relate to a method of making a polycrystalline diamond compact that includes forming a first layer of polycrystalline diamond precursor materials comprising diamond particles and a first concentration of catalyst, forming a second layer of polycrystalline diamond precursor materials comprising diamond particles and a second concentration of catalyst, wherein the second concentration of catalyst is greater than the first concentration of catalyst, placing a layer of an infiltrant material in the proximity of the first or the second layer of polycrystalline diamond precursor materials, wherein the infiltrant material is a catalyst, sintering the first layer and the second layer under high-pressure high-temperature conditions in the presence of the infiltrant material to form the polycrystalline diamond compact, thereby transforming the first layer into a close-packed polycrystalline diamond working layer and the second layer into a loose-packed polycrystalline diamond non-working layer and leaching at least a portion of the catalyst from the polycrystalline diamond compact.

In another aspect, embodiments of the present disclosure relate to a polycrystalline diamond construction that includes a close-packed polycrystalline diamond working layer comprising a plurality of interconnected diamond grains and a plurality of interstitial regions formed therebetween, the interstitial regions being substantially free of the catalyst used to form the working layer and a loose-packed polycrystalline diamond non-working layer, wherein, prior to sintering and leaching, the close-packed polycrystalline diamond working layer comprised a concentration of the catalyst lower than the loose-packed polycrystalline diamond non-working layer.

In yet another aspect, embodiments of the present disclosure relate to a polycrystalline diamond compact that includes a close-packed polycrystalline diamond working layer comprising a plurality of interconnected diamond grains and a plurality of interstitial regions formed therebetween, the interstitial regions being substantially free of the catalyst used to form the working layer and a loose-packed polycrystalline diamond non-working layer, wherein a thickness of the close-packed polycrystalline diamond working layer ranges from at least 1 mm to up to 1 mm less than the total thickness of the polycrystalline diamond compact.

BRIEF DESCRIPTION OF DRAWINGS

Embodiments of the present disclosure are described with reference to the following figures. The same numbers are used throughout the figures to reference like features and components.

DETAILED DESCRIPTION

Figure 1:
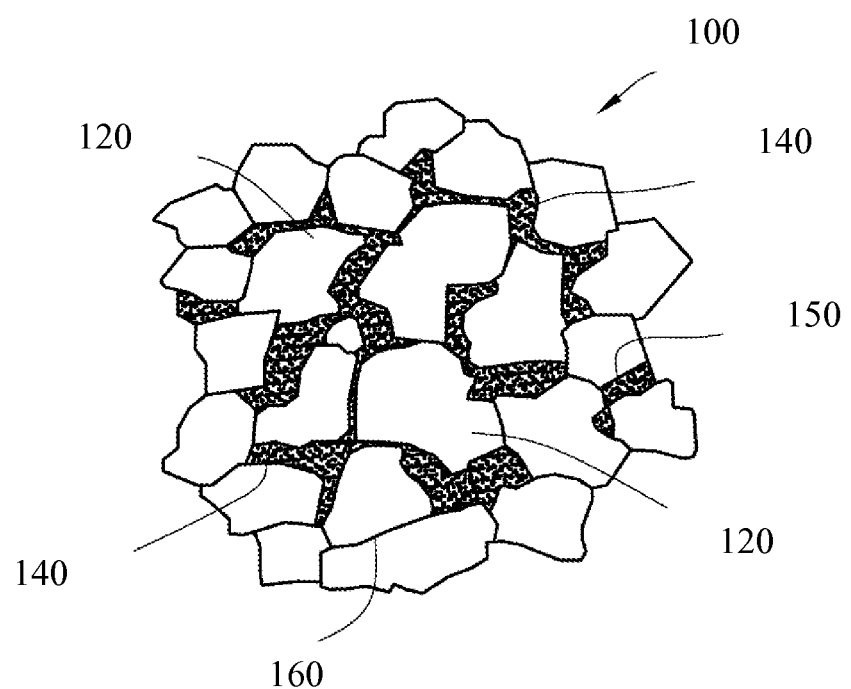
FIG. 1 shows the microstructure of a conventionally formed polycrystalline diamond.

Generally, embodiments disclosed herein relate to polycrystalline diamond (PCD) compacts and specifically, to methods of manufacturing polycrystalline diamond compacts that have been rendered thermally stable using methods and materials that may reduce the leaching time to remove catalyst and binder materials from the diamond lattice of manufactured polycrystalline diamond compacts.

In one or more embodiments of the present disclosure, PCD compacts may be formed by high-pressure high-temperature (HPHT) sintering of polycrystalline diamond (PCD) precursor materials such as diamond particles and a suitable catalyst or binder material to improve intercrystalline bonding between the diamond grains. Upon sintering the PCD body, the catalyst may remain within the interstitial regions formed between the bonded together diamond grains. The network of interstitial regions formed between the bonded together diamond grains may include interstitial regions that are directly or indirectly accessible to other interstitial regions formed within the PCD body, as well as interstitial regions that are inaccessible, which may be dispersed throughout the PCD microstructure.

To improve properties of the final PCD compact, additives including catalyst/binder are often leached from the compact following sintering. However, additive removal may be a time consuming process depending on the volume of the PCD material treated and the percent of catalyst or binder used. One potential approach to decrease the leaching time of an acceptable amount of additives in accordance with the present disclosure is to design the PCD compact such that one or more PCD layers contain increased amounts of catalyst or binder. While not limited by any particular theory, it is envisioned that, in layers containing an increased amount of additives or non-diamond materials, leaching is accelerated as pore channels produced by the dissolution of additives increase access and surface area exposure to additional leaching agent.

As used herein, "sintering" is a form of HPHT processing. Briefly, to form a sintered PCD body an unsintered mass or volume of diamond particles is placed within a metal enclosure of a HPHT apparatus. According to the present disclosure, diamond particles may be combined with a desired catalyst material in a reaction cell that is then placed under processing conditions sufficient to initiate the intercrystalline bonding between the diamond grains. It should be noted that if too much additional non-diamond material is present in the powdered mass of crystalline particles, appreciable intercrystalline bonding is prevented during the sintering process. Such a sintered material where appreciable intercrystalline bonding has not occurred is not within the definition of PCD. Following such formation of intercrystalline bonding, a PCD body may be formed that has, in one embodiment, at least about 80 percent by volume diamond, with the remaining balance of the interstitial regions between the diamond grains occupied by the catalyst material. In other embodiments, the PCD body may comprise at least 85 percent by volume diamond, and in another embodiment at least 90 percent by volume diamond. However, one skilled in the art would appreciate that other diamond densities may be used in alternative embodiments.

Generally, HPHT processing may be carried out at elevated pressures of about 55-60 kbar, and at an elevated temperature of at least 1400° C. Those of ordinary skill will appreciate that a variety of temperatures and pressures may be used, and the scope of the present disclosure is not limited to specifically referenced temperatures and pressures.

During sintering, catalyst materials may facilitate diamond intercrystalline bonding and adhesion of a PCD layer to another PCD layer, or a PCD layer to an underlying substrate, or a PCD layer to both another PCD layer and an underlying substrate. However, while higher catalyst content may increase the toughness of the resulting PCD material, the presence of catalysts within the diamond lattice may also decrease material hardness, thus limiting the flexibility of being able to provide PCD tables having desired levels of both hardness and toughness. Additionally, when variables are selected to increase the hardness of the PCD material, brittleness may also increase, thereby reducing the toughness of the PCD material.

Conventional catalyst-containing PCDs are stable at temperatures of up to 700-750° C., after which increases in temperature may result in permanent damage to and structural failure of the PCD. For example, upon heating of a PCD, the difference in the coefficient of thermal expansion of entrained catalyst as compared to that of the PCD causes the catalyst and the diamond lattices to expand at different rates, which may cause cracking and premature deterioration of the PCD. High temperatures, such as those during operation of a cutting instrument employing a PCD, may also lead to reversion of the diamond to graphite causing loss of microstructural integrity, strength, and wear resistance.

One approach to address differential expansion between the diamond and catalyst is to use chemical agents to "leach" the catalyst from the diamond lattice structure (either from a thin volume or the entire body) to reduce the damage to diamond-catalyst composites during heating and cooling. Briefly, leaching agents such as nitric acid or combinations of acids (e.g., nitric and hydrofluoric acid) may be used to treat a PCD body to remove at least a portion of the catalyst from the PCD composite. By leaching an amount of the catalyst from the PCD, thermally stable polycrystalline ("TSP") diamond may be formed. Depending on the applications of the PCD, a select portion or layer of a diamond composite may be leached, in order to gain thermal stability without losing impact resistance. As used herein, TSP includes both partially and completely leached materials. After leaching is completed, interstitial void volumes that remain may be reduced by either furthering consolidation or infiltrating the void volume with a secondary material having a favorable thermal expansion coefficient.

In one or more embodiments, after the HPHT process is completed, the PCD compact may be extracted from the HPHT device and further subjected to leaching conditions to remove the catalyst. As used herein, the term "removed" refers to the reduced presence of a catalyst material in the PCD body, and is understood to mean that a substantial portion of the catalyst material no longer resides in the PCD body. However, one skilled in the art would appreciate that the leaching process is limited in that trace amounts of catalyst/infiltrant material may still remain in the microstructure of the PCD body within the interstitial regions or adhered to the surface of the diamond grains.

Once leaching is completed and the PCD body is extracted from the leaching agent, the resulting material microstructure of the leached portion of the diamond body includes a first matrix phase of the bonded-together diamond grains and a second phase of a plurality of empty interstitial regions dispersed within the matrix phase. Thus, the leached portion of the diamond body may be substantially free of the catalyst material used to initially form or sinter the diamond body, and may be referred to as thermally stable polycrystalline diamond ("TSP").

As used herein, "substantially free" means that in some embodiments, a quantity of catalyst material may remain in the PCD material microstructure after the PCD body has been subjected to a leaching treatment, which may vary, for example, on factors such as the composition of the PCD body, e.g., the diamond density of the material, the diamond grain size, or the diamond body thickness, and the treatment conditions, e.g., the leaching agents that are used or the treatment time. For example, in some embodiments, a leached PCD body may include up to about 1 to 2 percent by weight (wt %) of residual catalyst material. In some embodiments, the leached PCD body may contain less than 5 wt % of residual catalyst. Residual catalysts may be in many instances trapped as inclusions within the microstructure, within layers of neck growth between diamond crystals, for example, within interstitial regions that are not directly or indirectly accessible to other interstitial regions, such as described above. However, such residual catalyst material may not affect the thermal stability of the resulting TSP body.

After exposure to a leaching agent, the catalyst/binder material may be removed from the PCD compact, leaving a network of channels distributed throughout the treated areas. Thus, the intercrystalline spacing of the PCD lattice may vary depending on the concentration of the catalyst prior to leaching. PCD containing relatively low concentrations of catalyst, e.g., 5 wt % or less, prior to leaching may form a crystalline lattice defined herein as "close-packed," while PCD containing higher concentrations, e.g., greater than 5 wt %, prior to leaching may form a crystalline lattice defined herein as "loose-packed." In some embodiments, the average diamond grain size may also influence whether the PCD is regarded as close- or loose-packed. For example, one skilled in the art will appreciate that a layer containing diamond grains of larger average size may be regarded as loose-packed as compared to a layer of PCD produced from the same relative catalyst and diamond particle concentrations, but having smaller average diamond grain sizes.

In one or more embodiments, PCD compacts may contain at least two different layers containing differing amounts of catalyst material prior to leaching. For example, PCD constructions may be created in which a layer containing a lower concentration of catalyst produces a close-packed layer, suitable for use as a working layer for drilling, is built on a layer having a higher concentration of catalyst that may be considered as a non-working layer. One feature of such a construction is that pore channels formed in the non-working layer having a higher concentration of catalyst will be larger; consequently, the transfer of acid from the outside surface of the PCD compact to its core may be increased, resulting in an accelerated leaching process.

Methods of manufacturing PCD compacts in accordance with the present disclosure may include forming layers of polycrystalline diamond (PCD) precursor materials containing diamond particles and one or more catalysts. For example, PCD constructions may be formed using a first layer of PCD precursor materials comprising diamond particles and a first concentration of catalyst and a second layer of PCD precursor materials comprising diamond particles and a second concentration of catalyst. Optionally, an infiltrant material used as an infiltration source may be placed in the proximity of the first or the second layer of PCD precursor materials. The infiltrant source may be a pure metal catalyst (provided as a powder or as a disk), or a carbide/metal catalyst powder mix, a metal alloy or an alloy/carbide powder mix.

Under HPHT conditions, the catalyst provided in the PCD precursor materials, infiltrant material, or both the precursor and infiltrant materials melts and facilitates intercrystalline bonding, as well as the adhesion of the close- and the loose-packed PCD layers to each other. As such, the first layer of polycrystalline diamond precursor materials transforms into a close-packed polycrystalline diamond (also referred to as a working layer), and the second layer of polycrystalline diamond precursor materials transforms into a loose-packed polycrystalline diamond (also referred to as a non-working layer). In some embodiments, the HPHT sintering may be carried out at temperatures of about 1350° C.-2100° C. and pressures of about 5.5-9.0 GPa. When forming a diamond body that is much thicker than conventional PCD sintered on a carbide substrate, the sintering temperature will be slightly higher than in the case of using a carbide substrate as an infiltration source. After the sintering process, the PCD layers may be subjected to leaching to remove at least a portion of the catalyst from the interstitial regions of the PCD, including both the close-packed PCD working layer, as well as the loose-packed PCD layer. This will further improve the thermal stability of the leached PCD compact, may facilitate subsequent processing of the leached PCD body, or both. Excess infiltrant material that has solidified outside of the PCD lattice structure may be removed before the leaching process by blasting, for example.

In some embodiments, the first and the second layers may contain varying weight percent ratios of diamond particles to catalyst. In one or more embodiments, the first layer may contain an amount of catalyst that is different than the second layer. In one or more embodiments, the first layer may include less than 5 percent by weight (wt %) of catalyst (or less than 2 wt % in other embodiments) with the remainder being diamond particles prior to sintering. In some embodiments, the first layer may include a catalyst concentration that ranges from 2 wt % to 5 wt %. In one or more embodiments, the second layer may include up to 20, 30, or 40 wt % of catalyst, with a lower limit of any of 5, 10, 15, or 20 wt %. It is also envisioned that a third layer may be included, having an even greater amount of catalyst premixed therein than the first and second layers. In some embodiments, the total amount of catalyst in the layers may be greater than 4 wt % of the total amount of the diamond powder weight for sintering.

PCD compacts in accordance with the present disclosure may be formed from polycrystalline diamond precursor materials such as diamond particles. Diamond particles may include, for example, natural or synthetic diamond, and may have varying particle sizes, depending on the end use application. For example, diamond particles may range in size from submicrometer to 100 micrometers, or with lower limits of any of 0.1, 1, 5, 10, 15, or 40 micrometers and upper limits of any of 100, 80, 50, 20, 15, or 10 micrometers, where any lower limit can be used with any upper limit. Further, diamond particles may have a monomodal distribution (having the same general average particle size) or a multimodal distribution (having different volumes of different average particle sizes).

It is also within the scope of the present disclosure that the diamond particle sizes may vary within an individual layer of the compact, may vary between individual layers, or may vary both within one or more individual layers and between individual layers. By using diamond particles with different average sizes, different content of the catalyst, or both different average diamond particle sizes and different catalyst content, polycrystalline diamond layers with different packing may be formed. In one or more embodiments, the average diamond particle size in the first layer is less than 30, 20, or 10 microns. In some embodiments, the first layer may contain diamond particles with at least two different average sizes (a bimodal distribution of particle sizes) for close packing, including one or more of a first size ranging from about 20 to about 30 microns, a second size ranging from about 10 to about 20 microns, a third size ranging from about 4 to about 8 microns and a fourth size ranging from about 0.1 to about 1 micron. However, other cuts of diamond particles may be used to form a particle size distribution that spans at least 15 or 20 microns (i.e., the smallest particles and the largest particles have at least 15 or 20 microns size difference therebetween). After mixing such particles, a close-packed arrangement is formed with an average diamond particle size of less than 30, 20, or 10 microns. In one or more embodiments, the average size of the diamond particles in the second layer is up to 50 microns, or up to 30, 20, or 10 microns. Further, in some embodiments, the second layer includes a narrower particle size distribution as compared to the first layer. For example, the particle size distribution may be less than 15 or 10 microns, and may be formed by using a single cut of diamond particles. However, it is also envisioned that other diamond particle sizes may be used.

Catalysts in accordance with present disclosure include materials that are useful for promoting re-crystallization of the surrounding diamond crystal lattice. Catalysts may be one or more of selected metals from Group VIII of the Periodic Table such as cobalt, nickel, or iron, or mixtures or alloys thereof. Such catalysts may be provided, in some embodiments, with other materials such as carbides, borides, nitrides, carbonitrides, and mixtures thereof. One or more catalysts may be provided with diamond particles to form the first and second layers but may also be provided as an infiltration source separate from the first and second layers that may infiltrate through the layers to aid in the formation of polycrystalline diamond as well as the bonding of the two layers together. In such embodiments, the use of a catalyst mixed with other materials may be particularly useful.

Figure 2A:
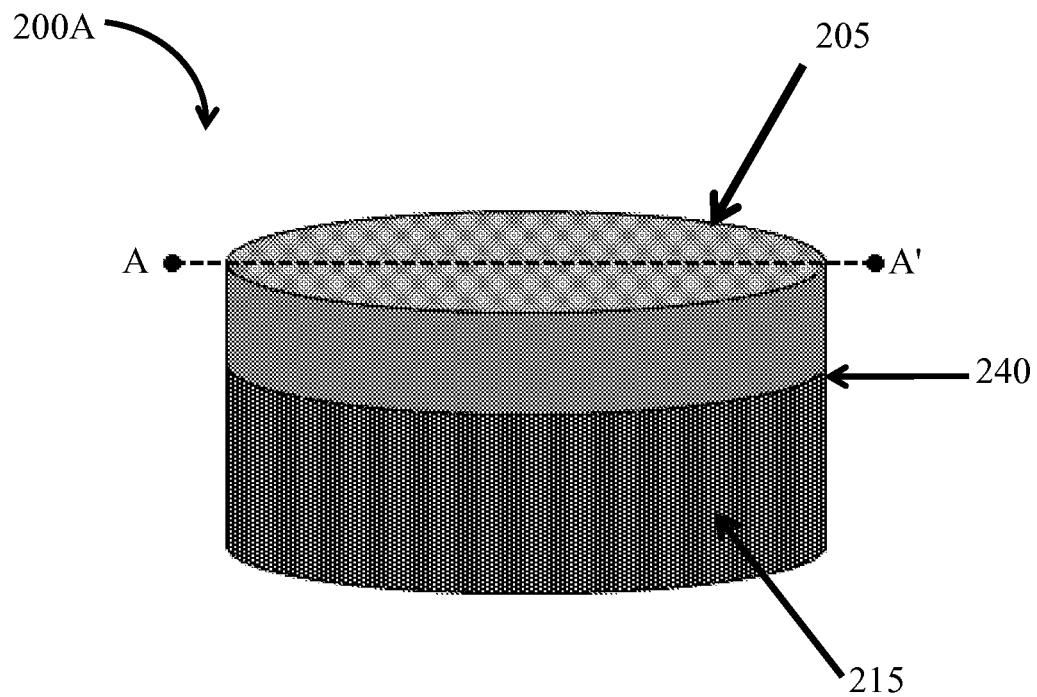
FIGS. 2A-2B show a polycrystalline diamond compact according to embodiments of the present disclosure.
Figure 2B:
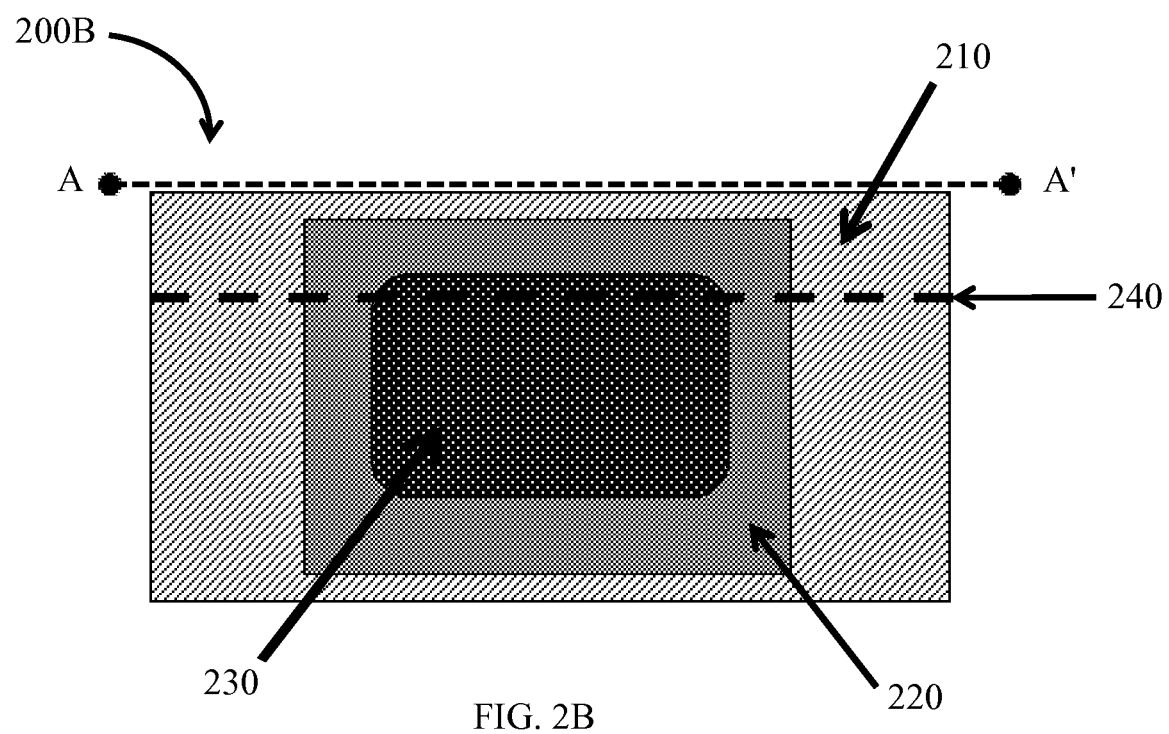

In one example, a comparative analysis between two PCD compacts with different catalyst content in the non-working layer was performed. FIGS. 2A-2B illustrate the preparation of the first PCD compact, according to an embodiment. FIG. 2A illustrates a perspective drawing of a PCD compact 200A including a close-packed PCD layer 205 and a loose-packed PCD layer 215. Close-packed PCD layer 205 is formed from precursor materials including diamond particles and less than 2 wt % cobalt, according to an embodiment. Loose-packed layer 215 is formed from precursor materials including diamond particles and 10 wt % cobalt as a catalyst, according to an embodiment. The higher cobalt wt % in the loose-packed PCD layer 215 occupies greater space between the diamond particles as compared to the close-packed PCD layer 205, leading to comparatively looser packing of diamond particles in the sintered loose-packed PCD layer 215. PCD compact 200A was sintered at 1600° C. with a pure cobalt layer (not shown) as an infiltrant on loose-packed PCD layer 215, according to an embodiment. The cobalt layer was placed in the proximity of the precursor materials for loose-packed PCD layer 215 prior to sintering, according to an embodiment. In an embodiment, the pure cobalt layer is located between the precursor materials to close-packed PCD layer 205 and the precursor materials to loose-packed PCD layer 215. In an embodiment, during the HPHT process, the pure cobalt provided as an infiltration source melts and facilitates the adhesion of the two PCD layers to each other. Excess cobalt layer was removed after the sintering condition by blasting. In an embodiment, the interface 240 between the close-packed PCD layer 205 and loose-packed PCD layer 215 is planar. In another embodiment, the interface is non-planar. In an embodiment, the sintered PCD cutter 200A has an outer diameter of about 10-20 mm.

FIG. 2B illustrates a cross-sectional side view of a PCD compact 200B, according to an embodiment. PCD compact 200B represents PCD assembly 200A after sintering and leaching, according to an embodiment. The cross-section of PCD compact 200B is taken through the location designated by line A-A' illustrated with respect to PCD cutter 200A in FIG. 2A. The loose-packed PCD layer 215 leaches more quickly as compared to the close-packed PCD layer 205, forming a gradient of cobalt concentration after a period of leaching time, according to an embodiment. Working layer 210, closest to the surface of PCD compact 200B, has significantly reduced cobalt wt %, according to an embodiment. In an embodiment, there is substantially no cobalt present in working layer 210. Non-working layer 220 contains a reduced amount of cobalt as compared to the amount present prior to leaching, according to an embodiment. An unleached layer 230 is located at the core of PCD 200B, according to an embodiment. The amount of cobalt in unleached layer 230 is not substantially changed. It is to be understood that while distinct borders are illustrated for sake of clarity, transitions in cobalt wt % between layers will be gradual and a gradient may exist within each layer. Interface 240 illustrates the interface between the close-packed and loose-packed sections of the PCD 200B, according to an embodiment.

Figure 3A:
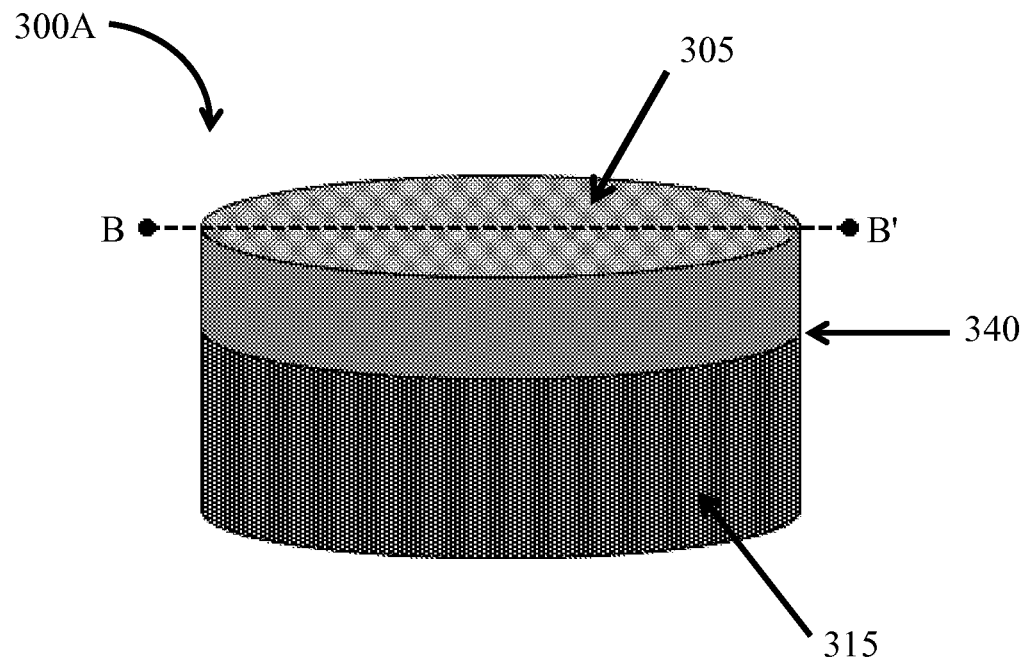
FIGS. 3A-3B show a polycrystalline diamond compact according to embodiments of the present disclosure.
Figure 3B:
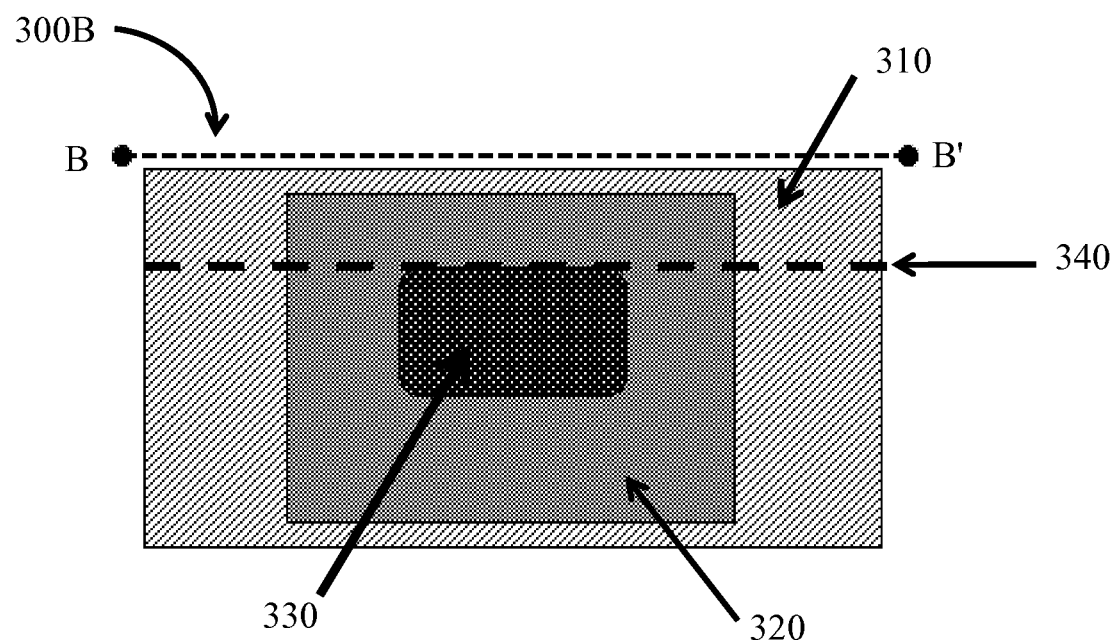

Referring to FIG. 3A, a second PCD compact 300A was prepared in a similar manner to PCD compact 200A, including a close-packed PCD layer 305 and a loose-packed PCD layer 315, according to an embodiment. The close-packed PCD layer 305 is formed from PCD precursor materials including diamond particles and less than 2 wt % cobalt, while the loose-packed PCD layer 315 is formed from PCD precursor materials including diamond particles and 15 wt % cobalt, according to an embodiment. The precursor materials are sintered at 1600° C. with a layer of pure cobalt (not shown) to form close-packed PCD layer is formed on a loose-packed PCD layer, according to an embodiment. Interface 340 between close-packed layer 305 and loose-packed layer 315 may be planar or non-planar. PCD compact FIG. 3B illustrates a cross-sectional side view of a PCD compact 300B, according to an embodiment. PCD compact 300B represents PCD compact 300A after a leaching cycle, according to an embodiment. The cross-section of PCD compact 300B is taken through the location designated by line B-B' illustrated with respect to PCD assembly 300A in FIG. 3A. The loose-packed PCD layer 315 leaches more quickly as compared to the close-packed PCD layer 305, forming a gradient of cobalt concentration after a period of leaching time, according to an embodiment. Working layer 310, closest to the surface of PCD compact 300B, has significantly reduced cobalt wt %, according to an embodiment. In an embodiment, there is substantially no cobalt present in working layer 310. Non-working layer 320 contains a reduced amount of cobalt as compared to the amount present prior to leaching, according to an embodiment. An unleached layer 330 is located at the core of PCD 300B, according to an embodiment. The amount of cobalt in unleached layer 330 is not substantially changed. It is to be understood that while distinct borders are illustrated for sake of clarity, transitions in cobalt wt % between layers will be gradual and a gradient may exist within each layer. Interface 340 illustrates the interface between the close-packed and loose-packed sections of the PCD 300B, according to an embodiment.

During the leaching process, non-working layer 320 of the PCD compact 300B in FIG. 3B containing 15 wt % cobalt was observed to have a faster leaching rate relative to the non-working layer 220 containing 10 wt % cobalt. Furthermore, as seen in FIG. 2B, the volume of the unleached layer 230 of the PCD compact 200B is higher than the unleached layer 330 of the PCD 300B in FIG. 3B. Thus, the leaching treatment may be accelerated in some embodiments by designing a PCD compact in such a manner that the loose-packed polycrystalline diamond layer has a higher content of the catalyst than the working layer.

According to embodiments of the present disclosure, the first, working layer of the PCD compact may form a circumferential cutting edge of the polycrystalline diamond compact. Further, in some embodiments the second, non-working layer can extend axially away from the working layer, radially away from the working layer, or both. In one or more embodiments, the non-working layer (having a greater amount of the catalyst than the working layer or larger pore sizes due to loose packing) may extend to at least one of a circumferential side surface and an upper surface of the diamond body.

Figure 4A:
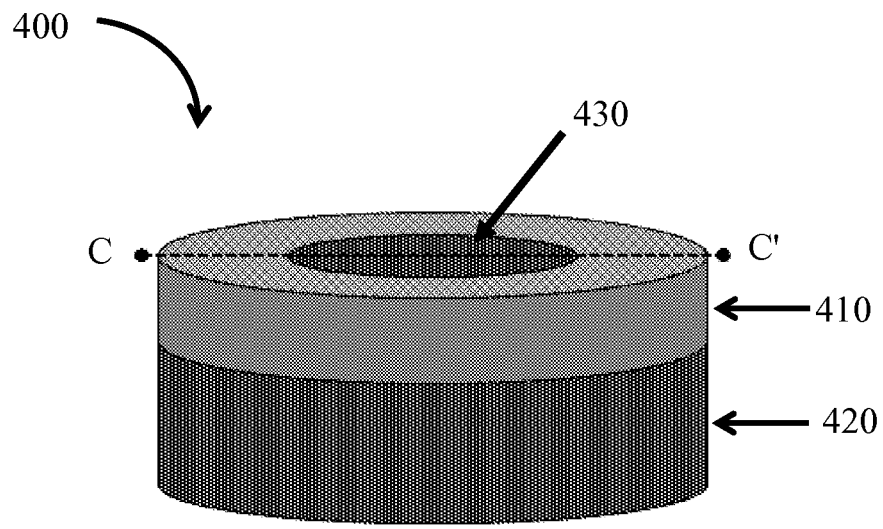
FIGS. 4A-4B show a polycrystalline diamond compact according to embodiments of the present disclosure.
Figure 4B:
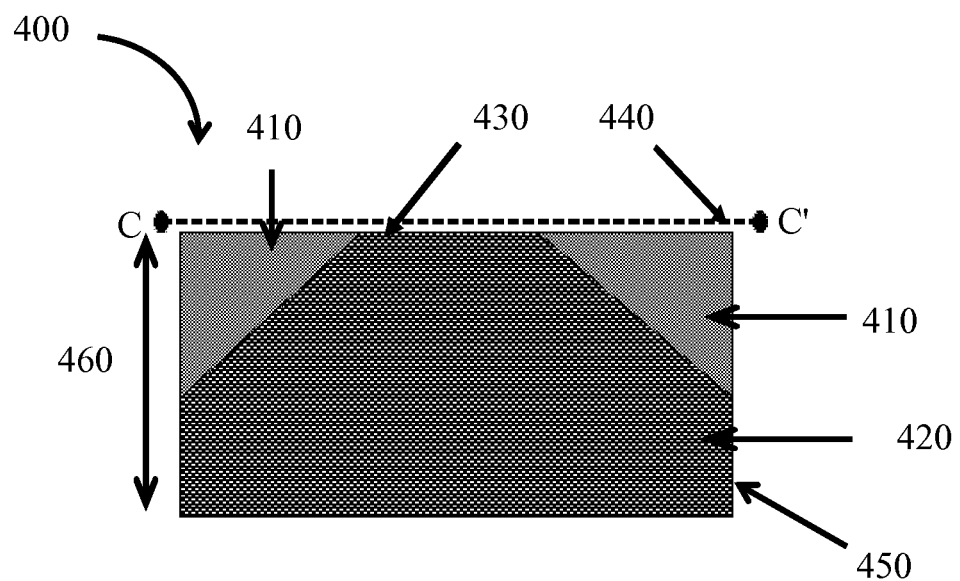
Figure 5:
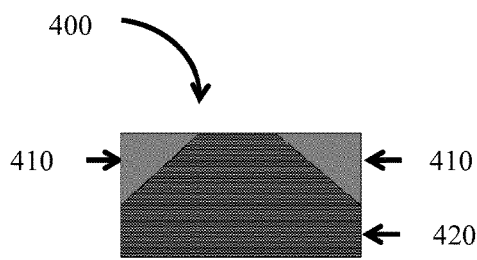
FIGS. 5-8 illustrate a comparative analysis of differing configurations of the polycrystalline diamond compacts according to embodiments of the present disclosure.

FIGS. 4A-4B illustrate perspective and cross-sectional views of a PCD compact 400, according to an embodiment. FIG. 4A illustrates a side perspective view of PCD compact 400. FIG. 4B illustrates a side cross-sectional view of PCD compact, taken along line C-C' in FIG. 4A. PCD compact 400 includes a close-packed PCD layer 410 and a loose-packed PCD layer 420 with 15 wt % cobalt, according to one embodiment. Working layer 410 is proximate to the circumferential cutting edge 440, according to an embodiment. Non-working layer 420 extends axially and radially away from the working layer 410, according to an embodiment. The non-working layer 420 has a higher content of catalyst than the working layer 410, or in other embodiments may be formed with a narrow diamond particle size distribution. Specifically, FIGS. 4A-4B show that the upper surface 430 is formed from both working layer 410 and non-working layer 420, respectively, with the working layer 410 being radially exterior to the non-working layer 420 along the upper surface 430 and a portion of circumferential side surface 450. In this embodiment, working layer 410 may extend less than 50% of the height 460 of body 400 along circumferential side surface 450, and specifically less than 30%. In one or more embodiments, the working layer 410 may extend along at least 15% or at least 20% or 25% (including up to 100%) of circumferential side surface 450. In various embodiments, the working layer 410 may extend at least 30%, at least 50%, or at least 75% of the distance or either the entire distance from the circumferential edge to the radial center of the body. According to the present embodiments, the working layer 410 and the non-working layer 420 of the PCD construction 400 may comprise a total thickness 460 of 0.100 to 0.700 inches (0.25 cm to 1.78 cm) from the upper surface 430 to the base of the non-working layer 420. However, other sizes and thicknesses may also be used. In one or more embodiments, the thickness of the working layer 410 ranges from at least 1 mm to up to 1 mm less than the total thickness of the PCD compact 460. In various embodiments, the PCD construction 400 may have a cylindrical shape. According to various embodiments, a ratio of the total thickness to the diameter of the PCD construction may vary from about 0.2:1 to about 1:1, with additional lower limits of 0.4 and 0.6. It is also envisioned that PCD constructions with other shapes can also be used as long as they may be attached to a bit body or other carbide bodies.

By strategically placing the close-packed layer 410 and loose-packed layer 420 as shown in FIGS. 4A-4B, the presence of channels formed in the loose-packed layer 420 may increase the mobility of leaching fluids into the close-packed layer 410 without sacrificing wear resistance at the cutting edge. Further, the increased exposure to leaching fluids then allows more complete removal of catalyst from the close-packed layer 410, and may result in a PCD having improved thermal stability.

Figure 7:
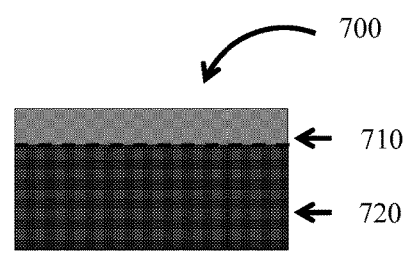
Figure 6:
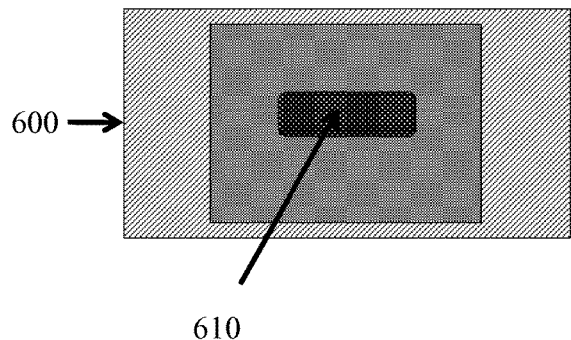
Figure 8:
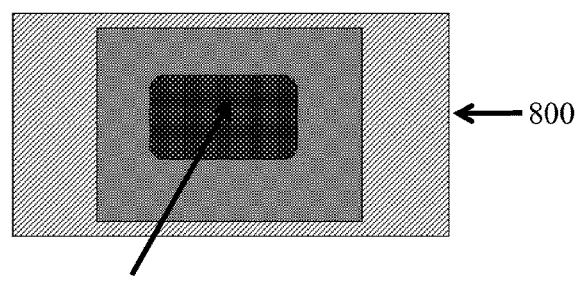

Referring to FIGS. 5-8, a comparative analysis between the PCD compact 400 of FIGS. 4A-4B (similar to that described in FIGS. 4A-4B) and a PCD compact 700 having a cylindrical design as shown in FIG. 7 was performed in order to determine the influence of the PCD design on the leaching rate. PCD compact 700 in FIG. 7 contained a close-packed PCD layer 710 placed on top of a loose-packed PCD layer 720, where the interface between the two layers was planar. Both PCD compacts 400 and 700, respectively, were prepared in a similar manner, by sintering under HPHT conditions a first layer of PCD precursor materials (not shown) containing diamond particles and less than 2 wt % cobalt on a second layer of PCD precursor materials (not shown) containing diamond particles and 15 wt % cobalt as a catalyst. The sintering was done in the presence of a layer of pure cobalt (not shown) used as an infiltration source placed in the proximity of the second PCD layer of precursor materials. Under HPHT conditions, the first and the second layers of PCD precursors materials form the close- and loose-packed PCD layers (410 and 420 for the PCD compact 400, and 710 and 720, respectively, for the PCD compact 700), while the infiltrant material melts and facilitates the adhesion of the close- and the loose-packed PCD layers to each other. Both PCD compacts 400 and 700 were leached together by acid leaching. The cobalt infiltrant layer was removed before the leaching process.

Upon leaching, the catalyst material is removed from the PCD compact, when channels distributed throughout the entire polycrystalline diamond compact may form. Because the non-working PCD layer of compacts 400 and 700 include a higher content of the catalyst than the working layer, the non-working layer has larger pore channels after leaching. Furthermore, with respect to FIG. 5, the interface design of the working layer 410 and non-working layer 420 in the PCD compact 400 enhances the ability of the acid to reach the center core of the PCD compact from the top surface as fast as from the outer diameter edge. Therefore, the core of the PCD compact can be leached faster. As such, it was observed that after leaching the PCD compacts 400 and 700 for 28 days, the leached PCD compact 600 of FIG. 6 has a smaller unleached core 610 compared with the unleached core 810 of the leached PCD compact 800 of FIG. 8.

According to the present disclosure, the non-working layer may include multiple non-working layers, in which the layers contain varying concentrations of catalyst. By creating a gradient of catalyst concentration, the final PCD structure may exhibit improved matching of thermal and physical properties (e.g., expansion coefficient, hardness, etc.) between the layers to increase the durability of the PCD compact. In one or more embodiments, PCD compacts containing multiple layers may be designed such that each layer may have a different catalyst concentration, a different diamond size, or both. For example, the PCD compacts may contain three layers designed as follows: the first layer (also referred to as the working layer) may be premixed with cobalt ranging from about 0 wt % to about 5 wt %, the second layer may be premixed with cobalt ranging from about 5 wt % to about 15 wt %, and the third layer may be premixed with more than 15 wt % cobalt. It is also within the scope of the present disclosure that the interface between the working and non-working layers in multi-layer PCD compacts may be planar or non-planar.

Methods of the present disclosure may provide for improved leaching rates and leaching depths. This may be achieved by using a loose-packed non-working layer having a content of catalyst higher than the working layer, by designing the interface between the working and non-working layers to enhance the ability of the acid to reach the center core of the PCD compact, or a combination of both. As noted above, upon leaching a PCD containing a loose-packed polycrystalline diamond with a high content of catalyst, large pore channels are formed. Thus, the ability to deliver fresh leaching agent through the channels of the PCD body to the channels that remain filled with catalyst is improved. For example, PCD bodies with a close-packed layer may have less accessible interstitial regions to provided leaching agents, and the provided leaching agent may become trapped along with the interstitially bound catalyst material. Thus, by using the PCD diamond compact designs and the methods of the present disclosure, compacts may be produced that have interstitial regions that are substantially free of catalyst material and exhibit improved thermal stability.

While some leaching techniques may take many weeks for sufficient removal of the catalyst material from a PCD body to occur, the inventors of the present disclosure have found that a leaching process may be accelerated by forming a PCD compact with layers containing different catalyst material concentrations as above noted, by designing the interface to enhance the ability of the acid to reach the center core of the PCD compact, or by a combination of both. As such, acceptable or improved levels of catalyst removal are achieved in a reduced amount of treatment time.

Figure 9:
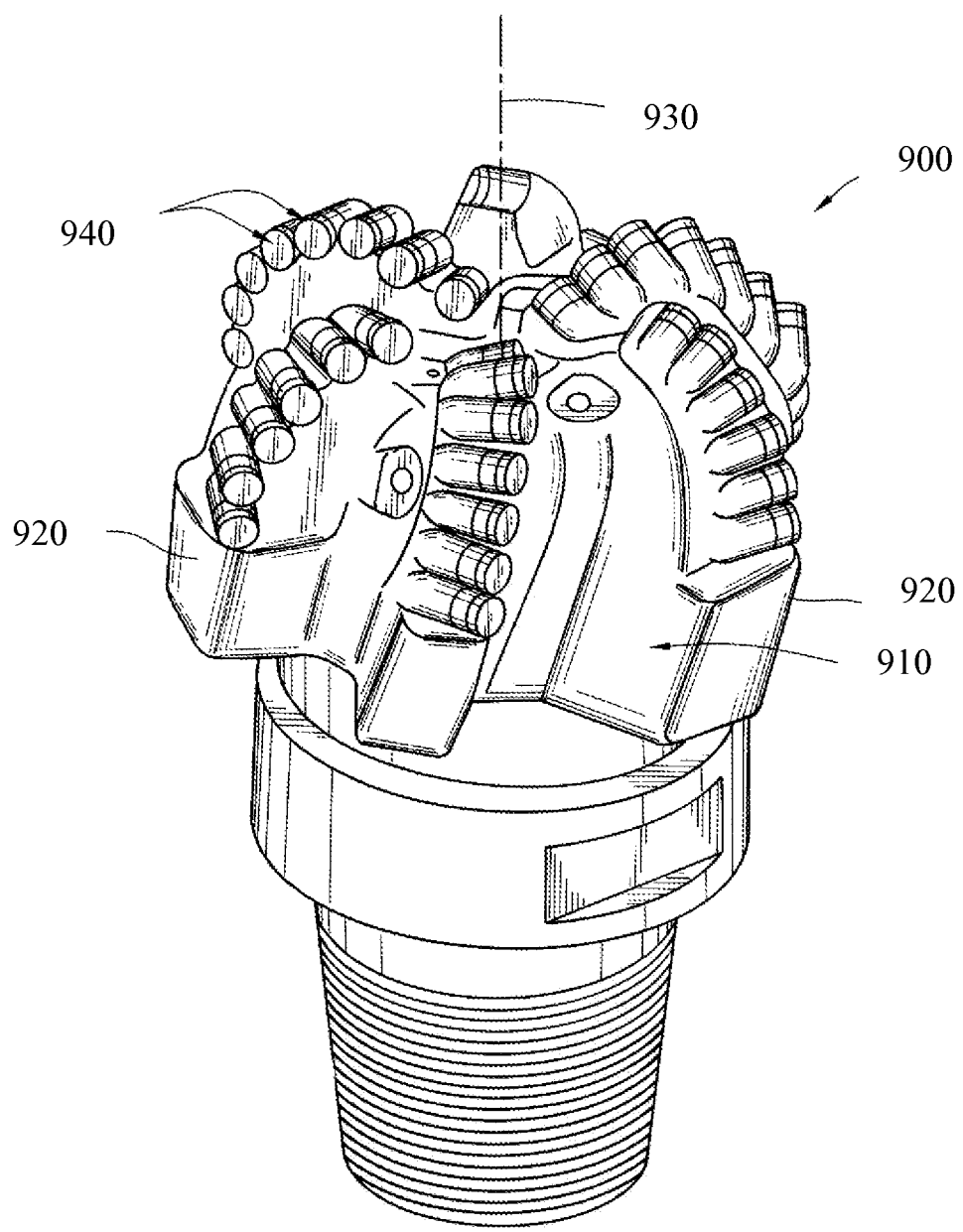
FIG. 9 shows a PCD-equipped drill bit in accordance with embodiments of the present disclosure.

Polycrystalline diamond bodies made according to embodiments of the present disclosure may be used as cutting elements on downhole cutting tools, such as drill bits. For example, downhole tools of the present disclosure may have a body, a plurality of blades extending from the body, and at least one PCD cutting element according to embodiments of the present disclosure disposed on the plurality of blades. The at least one PCD cutting element is disposed on the blades such that a working surface, e.g., a surface that contacts and cuts the formation being drilled, is positioned at a leading face of the blade and faces in the direction of the drill bit's rotation. For example, FIG. 9 shows a rotary drill bit 900 having a bit body 910. The lower face of the bit body 910 is formed with a plurality of blades 920, which extend generally outwardly away from a central longitudinal axis of rotation 930 of the drill bit. A plurality of PCD cutters 940 are disposed side by side along the length of each blade. The number of PCD cutters 940 carried by each blade may vary.

Although only a few example embodiments have been described in detail above, those skilled in the art will readily appreciate that many modifications are possible in the example embodiments without materially departing from this disclosure. Accordingly, all such modifications are intended to be included within the scope of this disclosure. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:

1. A method of making a polycrystalline diamond compact, comprising:
   forming a first layer of polycrystalline diamond precursor materials comprising diamond particles and a first concentration of a first catalyst;
   forming a second layer of polycrystalline diamond precursor materials comprising diamond particles and a second concentration of the first catalyst, wherein the second concentration of the first catalyst is greater than the first concentration of the first catalyst;
   placing a layer of a catalytic infiltrant material in the proximity of at least one of the first layer of polycrystalline diamond precursor materials or the second layer of polycrystalline diamond precursor materials;
   sintering the first layer and the second layer under high-pressure high-temperature conditions in the presence of the catalytic infiltrant material to form the polycrystalline diamond compact, thereby transforming the first layer into a close-packed polycrystalline diamond working layer and the second layer into a loose-packed polycrystalline diamond non-working layer, wherein both the close-packed polycrystalline diamond working layer and the loose-packed polycrystalline diamond non-working layer form an outer surface of the polycrystalline diamond compact; and leaching at least a portion of the first catalyst from the polycrystalline diamond compact.

2. The method of claim 1, wherein the catalyst is one or more selected from metals from Group VIII of the Periodic Table.

3. The method of claim 1, comprising leaching the polycrystalline diamond compact until it contains less than 5 wt % of catalyst.

4. The method of claim 1, comprising forming channels throughout the working layer and non-working layer of the polycrystalline diamond compact, wherein the channels formed in the loose-packed polycrystalline diamond non-working layer have a larger pore size than the channels in the working layer.

5. The method of claim 1, wherein the first layer and the second layer comprise diamond particles of different average sizes.

6. The method of claim 5, wherein the average size of the diamond particles in the first layer is within the range of 5-30 microns and the average size of the diamond particles in the second layer is within the range of 10-50 microns.

7. The method of claim 1, wherein prior to sintering and leaching the first layer comprises less than 5 wt % of catalyst and the second layer comprises more than 5 wt % of catalyst.

8. The method of claim 1, wherein the total amount of catalyst is greater than 4 wt % of the total amount of diamond particles prior to sintering.

9. The method of claim 1, wherein the first layer forms a circumferential cutting edge of the polycrystalline diamond compact and the second layer extends axially away from the first layer, radially away from the first layer, or both axially and radially away from the first layer.

10. The method of claim 1, wherein a thickness of the first layer ranges from at least 1 mm up to 1 mm less than the total thickness of the polycrystalline diamond compact.

11. The method of claim 1, wherein the leaching also leaches at least a portion of the catalytic infiltrant material from the polycrystalline diamond compact.

\* \* \* \* \*